United States Patent [19]
Riefler et al.

[11] Patent Number: 5,141,804
[45] Date of Patent: Aug. 25, 1992

[54] INTERLEAF LAYER IN FIBER REINFORCED RESIN LAMINATE COMPOSITES

[75] Inventors: R. Scott Riefler, Belair; John W. Powers, Jarrettsville, both of Md.

[73] Assignee: American Cyanamid Company, Stamford, Conn.

[21] Appl. No.: 526,923

[22] Filed: May 22, 1990

Related U.S. Application Data

[62] Division of Ser. No. 264,309, Nov. 1, 1988, Pat. No. 4,954,382.

[51] Int. Cl.⁵ .................. B32B 27/08; B32B 27/12
[52] U.S. Cl. .................. 428/290; 156/292; 156/306.9; 156/307.3; 428/473.5
[58] Field of Search ............ 428/116, 290, 294, 413, 428/414, 473.5, 902; 156/292, 306.9, 307.3

[56] References Cited

U.S. PATENT DOCUMENTS

| | | | |
|---|---|---|---|
| 3,528,950 | 9/1970 | Lubowitz | 528/229 |
| 3,745,149 | 7/1973 | Serafini et al. | 524/600 X |
| 4,061,812 | 12/1977 | Gilwee, Jr. et al. | 428/117 |
| 4,135,019 | 1/1979 | Kourtides et al. | 428/73 X |
| 4,166,170 | 8/1979 | St. Clair | 528/229 |
| 4,233,258 | 11/1980 | St. Clair | 428/473.5 X |
| 4,239,883 | 12/1980 | Stenzenberger | 428/473.5 X |
| 4,539,253 | 9/1958 | Hirschbuehler et al. | 428/229 |
| 4,604,319 | 8/1986 | Evans et al. | 428/114 X |
| 4,868,050 | 9/1989 | Tanaka et al. | 428/473.5 X |
| 4,892,774 | 1/1990 | Vallance | 428/174 |
| 4,908,088 | 3/1990 | Boyd et al. | 156/307.3 X |
| 4,954,195 | 9/1990 | Turpin | 156/307.3 X |
| 4,954,382 | 9/1990 | Riefler et al. | 428/413 X |
| 4,957,801 | 9/1990 | Maranci et al. | 428/902 X |

*Primary Examiner*—Henry F. Epstein
*Attorney, Agent, or Firm*—Frank M. Van Riet

[57] ABSTRACT

Laminated composites made with layers of fiber reinforced thermosetting resin prepregs and with thermoplastic film interleaf layers are improved by using thermoplastic film coated with thermosetting adhesive as the interleaf layer. In composites having a honeycomb core with thermosetting prepreg skins, the thermoplastic film is a moisture barrier to exclude water vapor from the honeycomb cavities.

2 Claims, 1 Drawing Sheet

INTERLEAF LAYER IN FIBER REINFORCED RESIN LAMINATE COMPOSITES

This is a divisional of co-pending application Ser. No. 07/264,309, filed on Nov. 1, 1988, now U.S. Pat. No. 4,954,382.

The invention relates to improvements in interleaf sheets of thermoplastic resin which are useful as interleaf layers to strengthen laminated composites made by lamination of fiber reinforced thermosetting resin layers. The invention further relates to improved composites which incorporate such interleaf sheets.

Laminated composites of fiber reinforced thermosetting resin layers have been made for many industrial uses, such as structural members for aircraft construction, for example. Articles made from fiber reinforced resin composites have excellent strength per unit weight. The composites are made by laminating sheets or tapes of thermosetting resin filled with reinforcing fiber filaments. Various thermosetting resins useful for making the fiber reinforced sheets include a number of epoxy, bismaleimide, polyamide and acetylene-terminated resins, for example. Fibers used to reinforce the resin include fibers of graphite, carbon filaments, glass filaments, filaments of silicon carbide or boron, resin filaments of aramid, polyimide, rayon, polybenzamidazole or polybenzothiazole resins, metal coated fibers or filaments, and the like.

The use of interleaf layers to improve strength and integrity of fiber reinforced resin composites began with the use of interleaf sheets of thermosetting resin, usually thinner than the fiber reinforced sheets in the composite. Composite structures made with thermosetting interleafs were described for example, in U.S. Pat. No. 4,539,253.

A later development was the use of thermoplastic resin interleaf layers in composites of fiber reinforced thermosetting resin layers. U.S. Pat. No. 4,604,319 described the improvement of impact strength and toughness of fiber reinforced resin composites attained by use of thermoplastic resin films as interleafs in composites of fiber reinforced thermosetting resin layers.

In making a composite with thermoplastic interleafs, a stack of fiber reinforced thermosetting resin sheets is laid up with thinner sheets of thermoplastic resin film interleaved between sheets of the fiber reinforced resin prepreg. The stack is then heated and pressed to bond the sheets as discrete layers in a unitary laminated composite. Adhesive bonding of thermoplastic interleafs in the composites depends largely upon adhesive bonding properties of the thermosetting resin in adjacent layers. Adhesive bonding properties of the thermoplastic resin alone are usually inadequate for good bonding, particularly in the case where two interleaf layers are overlapped or laid up together in a composite. Areas in the composite where two thermoplastic interleafs have been laid in surface contact with each other will often be inadequately bonded after curing where the interleaf surfaces are in contact, causing structural weakness at such areas in the composite.

Nevertheless, advantages that are obtained by use of thermoplastic interleafing in making laminated composites can be of significant and substantial benefit. An object of the invention is to provide improved interleaf sheets which provide the advantages obtained by use of thermoplastic films as interleaf layers in making fiber reinforced resin composites and which eliminate or substantially reduce the disadvantages noted above.

This and other objects of the invention are attained by using as interleaf layers in a composite, a thermoplastic resin film which has been coated on both sides with a thin coat of a thermosetting adhesive resin.

BRIEF DESCRIPTION OF THE DRAWINGS

In the drawings, the invention is illustrated in two embodiments.

Figure 1:
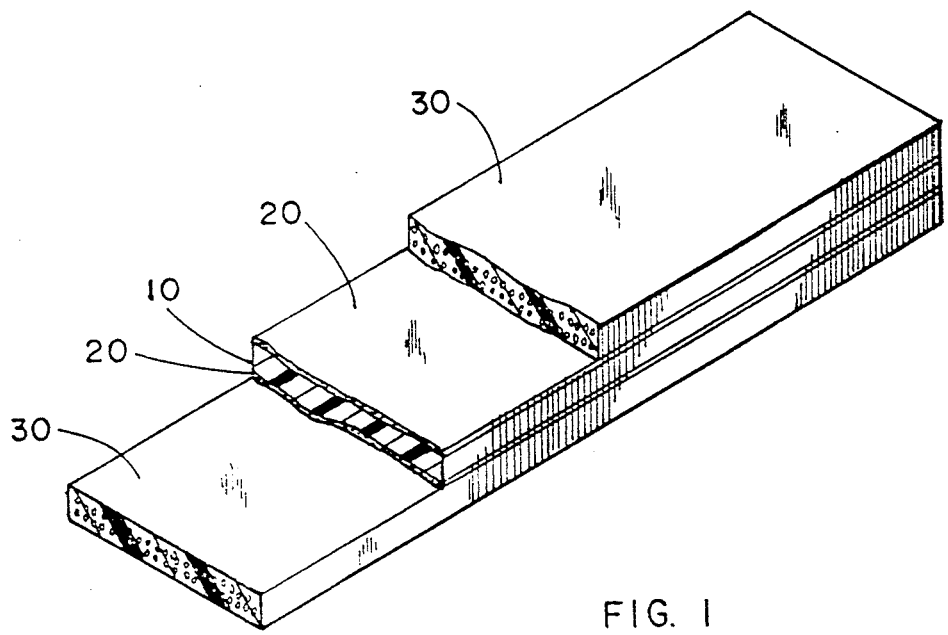
FIG. 1 illustrates the position of a thermoplastic interleaf layer 10 coated on both sides with thermosetting adhesive resin 20 in a laminated composite between two fiber reinforced thermosetting resin layers 30.
Figure 2:
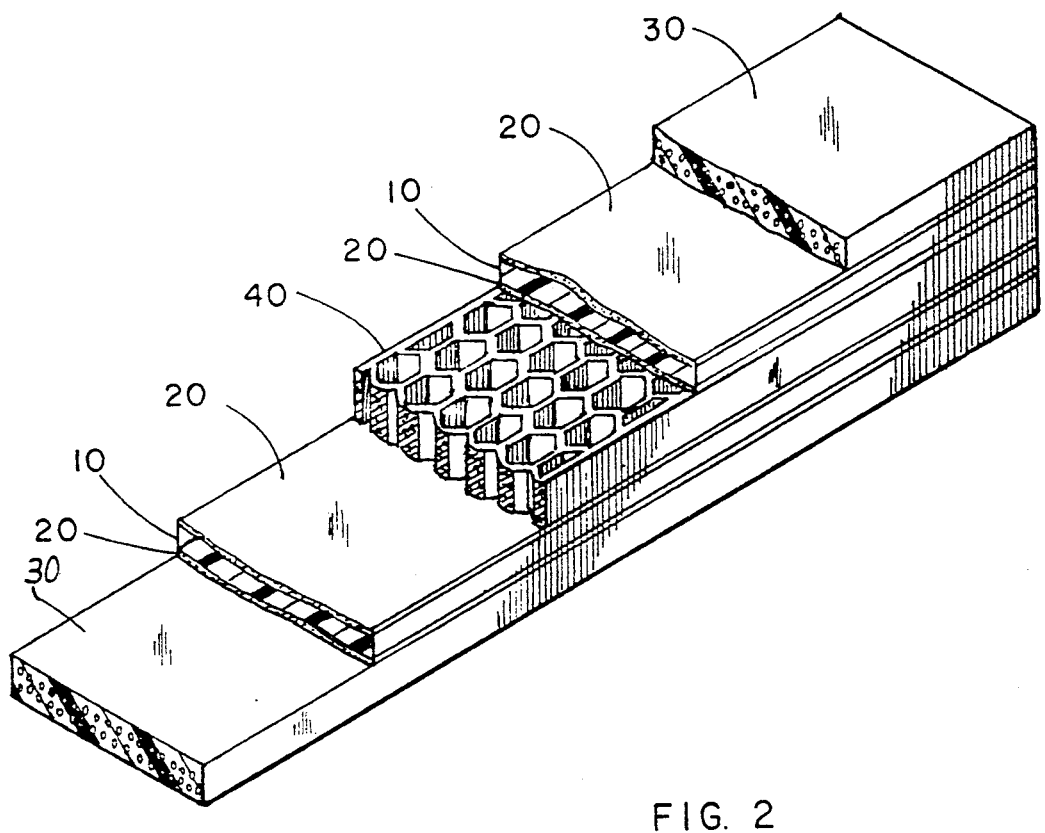
FIG. 2 illustrates the position in a laminated composite of two thermoplastic interleaf layers 10, each coated on both sides with thermosetting resin 20, each interleaf being positioned in the composite between a fiber reinforced thermosetting resin layer 30 and a honeycomb year 40.

The thermosetting resin composition, that is, the matrix resin which fills the reinforcing filaments in the prepregs preferably will exhibit certain specific properties. The matrix resin, when tested "neat", or without reinforcement, should show a minimum stiffness when subjected to shear forces, especially at high temperatures and under wet conditions. The matrix resin should have a shear modulus of at least 90,000 psi under hot, dry conditions, e.g., when subjected to shear at 180° F. -270° F., or a shear modulus of at least 50,000 psi under hot, wet conditions, e.g., when subjected to shear at 180° F.-270° F. after soaking in water at 160° F. for 14 days. It is also preferred that the matrix resin have a shear modulus above about 100,000 at room temperature and extremely low temperatures, i.e., $-67°$ F. , however, this is ordinarily the case where the modulus at 180°-200° F. is as high as 50,000 psi. Preferred matrix resin compositions will show an initial shear modulus of 90,000 psi or above under hot, wet conditions, and will show an initial shear modulus of 130,000 psi or above at room temperature and low temperatures. The most preferred thermosetting resins for use as a matrix resin will also exhibit high strength for example an ultimate stress over 3000 psi, most preferably 5000 psi or above.

A number of suitable matrix resins having these properties, and which are suitable for use in fiber reinforced prepregs for making interleaved composites, are known. Many were described in U.S. Pat. No. 4,604,319. They include epoxy resins for making composites generally suitable for use in ordinary temperature conditions and polyimide resins which are cured at higher temperatures and can withstand applications at higher temperatures.

Thermoplastic films which are coated to make the interleaf sheets for use in composites according to the invention are generally the same films that were described for use as interleafs in U.S. Pat. No. 4,604,319.

The interleaf should be of a thermoplastic resin that can maintain a discrete continuous thermoplastic layer in the composite through the forming processes and in the finished composite. Preferably the glass transition temperature, $T_g$, of the thermoplastic resin is relatively high, e.g. above 140° C. and in some preferred embodiments even higher. The thermoplastic resin must be one that can bond with the thermosetting resin of the fiber reinforced sheet to make a strong bond between discrete thermoplastic and thermosetting layers in an interleaved composite.

The thermoplastic resin of the interleaf sheet comprises a high molecular weight engineering thermoplastic, such as a polyester, a polyamide, a polyaramid, a polyacrylate, a polycarbonate, a poly(ester carbonate), a polybenzimidazole, a polyimide, a polyether imide, a polyamide imide, and the like. Preferably the thermoplastic will be a polyether ether ketone, e.g. PEEK (ICI), a polyimide, e.g. KAPTON ® (DuPont), or a polyether imide, e.g. ULTEM ® (General Electric) or others described below. The thermoplastic resin may contain a minor amount (up to 40% by weight) of a thermosetting resin, which may for example be of the same composition as the matrix resin, as may be necessary or desirable in a given application to achieve suitable solvent resistance or other material properties of the interleaf. In addition, it may be advantageous in the practice of the invention to utilize reinforcing materials in the interleaf, such as mat scrim, whiskers, particulates, chopped fibers or other second phase reinforcement, and in general the reinforcing material may suitably be employed in various amounts, such as for example up to about 50% by weight based on the total weight of the interleaf.

The thermoplastic interleaf resin must also exhibit a minimum initial shear modulus, and in addition must show elongation above a minimum stress. This initial modulus is believed to transfer loads between the layers of the reinforcing fibers without large deformation of the structure. For the purposes herein, the interleaf material must have an initial shear modulus above 50,000 psi at high temperatures, preferably above 90,000 psi at 180° F.-270° F. At room temperature the initial shear modulus for the interleaf should be at least about 100,000 psi (preferably at least 130,000 psi) and at $-67°$ F. the shear modulus should be at least about 130,000 psi (preferably at least 150,000 psi); however, as with the matrix resin, such values at room temperature and low temperatures would be expected with high shear modulus at elevated temperatures. Most preferably, the interleaf resin will be slightly soluble in the uncured or partially cured thermosetting matrix or coating resin at temperatures used to form and cure the composites. This aids in providing adhesive bonding at each interface. The interleaf resin must, of course, also be able to maintain a discrete layer at the curing temperatures, up to about 475° F.

The thermoplastic interleaf resin shows an initial rigidity (high modulus) when subjected to shear but at a certain level of shear stress, shows elongation (high ultimate strain). The point at which the resin begins to show high elongation in response to stress is the "yield strength" of the resin, and for the purposes herein, this must be at least about 3000 psi at high temperatures, e.g. over 180° F. Most preferred interleaf resins will have a room temperature yield strength of at least about 6000 psi and a high temperature yield strength of at least about 5000 psi.

For high temperature applications we prefer to use films of thermoplastic resins having glass transition temperature of at least 285° C. Thermoplastic films having suitable high temperature properties for use as interleafs in high temperature composites comprise thermoplastic polyimide and polyether imide resins having glass transition temperatures above 185° F. These include films sold commercially under tradenames KAPTON, UPILEX S and UPILEX R. UPILEX R is especially preferred. These films as received from the manufacturer have been surface treated by plasma etching or by corona discharge and such surface treatment is found to enhance the bonding properties of the film. Further surface treatment of the film with a solvent such as methylene chloride may also enhance bonding.

KAPTON (Dupont) is a thermoplastic polyether imide resin film.

UPILEX S (ICI) is a thermoplastic polyimide resin film.

UPILEX R (ICI) is a thermoplastic polyimide resin film.

Thickness of the uncoated interleaf film may range from about 0.3 mil (7.6 micron) to about 5 mil (0.13 mm) and preferably about 0.5 to 1.0 mil (13-25 micron). Thickness of coating on each side of the film may be in the range from 0.1 to 5 mils (2.5-127 microns), and preferably 0.25 to 2 mils (6.3 to 51 microns).

For making epoxy laminate composites, the temperature for curing and the temperatures encountered in use will not be as severe as with the thermosetting bismaleimide resin composites. We nevertheless prefer the same thermoplastic films described above as interleafs for use with with either epoxy or bismaleimide resin prepregs. The properties of those films are suitable for improving strength and toughness of fiber reinforced epoxy resin composites, as was shown in the U.S. Pat. No. 4,604,319.

Thermosetting adhesive compositions for coating the thermoplastic interleaf sheet must be capable of forming a thermoset adhesive bond at temperatures that are used for curing the reinforced thermosetting layers of the composite. The coating resins must be capable of bonding the reinforced thermosetting resin layers with the discrete thermoplastic interleaf layer in the process of making the composite. Also, the thermosetting adhesive coating on the interleaf should bond one interleaf to another at the composite curing temperature. The thermosetting adhesive coat on each surface of the thermoplastic sheet may be a formulation of the same thermosetting resin composition that is in the fiber reinforced layer. Or it may be another resin that can bond compatibly at curing temperature with the resins of the thermoplastic and thermosetting layers.

Thermosetting resin compositions for use in formulations for coating the thermoplastic interleaf sheets include those thermosetting epoxy, bismaleimide, polyamide and acetylene terminated resins that are used for making the fiber reinforced thermosetting resin prepregs used for making laminated composition.

For making coated interleafing layers useful in composites of epoxy prepregs we prefer to use an epoxy coating formulation that will be compatible for forming an adhesive bond with the thermoplastic interleaf and the epoxy prepreg in the composite. Thermosetting epoxy resin prepolymers useful to coat the interleaf layer include those comprising polyepoxides described in U.S. Pat. No. 4,604,319. Those prepolymers include polyfunctional ethers of polyvalent phenols, polyglycidyl ethers of halogenated diphenols, of novolacs, of polyphenol products from condensation of phenols and dihaloparafins. Others include polyepoxy compounds of aromatic amines and epichlorohydrin. Also, glycidyl esters or epoxycyclohexyl esters of polycarboxylic acids, glycidyl ethers of polyhydric alcohols, polyglycidyl thioethers of polyvalent thiols, and the like. Polyepoxides suitable for making epoxy resins useful in laminated composites are well known. The thermosetting formulation for making thermosetting epoxy resins will also include a curing agent. usually a diamine or other polyamine. or other suitable thermosetting epoxy curing agent.

Polyimide monomers which may be used in thermosetting coating formulations include those described in U.S. Pat. Nos. 3,528,950; 3,745,149; 4,233,258 and 4,166,170. For high temperature composition we especially prefer to use the bismaleimides. The monomers may be used without a curing reactant but we prefer to use a curing reactant. A most preferred curing reactant for use in polyimide thermosetting resin compositions is O,O-diallyl bisphenol A. To regulate tackiness of the coating. we may use a ratio by weight of curing reactant to bismaleimide in the range from 0.25 to 4 in the coating formulation. A preferred ratio is one to one.

In preferred embodiments the resin coating on the thermoplastic interleaf sheet will be slightly tacky at room temperature. This assists in holding the interleaf sheets in position when laying up a stack of sheets for making a composite. Tackiness of the thermosetting resin coat can be adjusted by varying the amount of curing agent (Part B) in the thermosetting formulation.

A preferred thermosetting adhesive coating for thermoplastic interleaf sheets according to the invention is a mixture of thermosetting bismaleimide resin precursors. One component of our most preferred mixtures is COMPIMIDE 353 obtained from Technochemic GMBH. This is an eutectic mixture of methyl dianiline bismaleimide, and toluene dianiline bismaleimide and trimethyl hexanethylene diamine bismaleimide. A second component is 4'4'-bismaleimidophenyl methane, which is Part A of Ciba Geigy 5292 and a third component is Part B of Ciba Geigy 5292, i.e. O,O-diallyl bisphenol A.

These components are mixed and thoroughly blended in proportions shown to make two preferred coating formulations as follows:

| Component | Formulation I wt % | Formulation II wt % |
|---|---|---|
| Compimide 353 | 41% | 12% |
| Ciba Geigy 5292 Part A | 18% | 47% |
| Ciba Geigy 5292 Part B | 41% | 41% |

The components of Formulations I and II above. respectively, are combined at a temperature of 150° to 250° F. and thoroughly blended by a mixer for about two hours. Viscosity of the formulation may be adjusted by addition of solvent as needed. Suitable solvents are volatile solvents such as methylene chloride.

Before applying the coating formula to the thermoplastic film surface it is preferred to have the film surface treated with irradiation by plasma or corona discharge. The films we prefer to use have been so treated by the film manufacturer. Further surface treatment with volatile organic solvent is preferred to clean the surface. The solvent may further activate the surface by a solvating process.

The prepared film is then coated on both sides with a continuous thin coating of the selected coating formulation in suitable solvent. Any suitable coating method may be used, such as by doctor blade, roll coating, or the like. The coating is dried by evaporation of volatile solvent at a suitable drying temperature usually in the range from about 70° F. to about 150° F.

Formulations I and II described above when coated and dried on a thermoplastic film leave a slightly tacky coat on the film. This coated film is ready for use as an interleaf.

The invention is described in more detail by reference to specific examples illustrating some preferred embodiments of the invention, as follows.

EXAMPLE 1

Coated interleaf layers are made with several thermoplastic films of the kinds described above, having various thicknesses and surface treatments as shown in Table 1. Formulations I and II described above are applied to respective films by drawing the films through the coating formulations diluted with methylene chloride solvent and then drawing the films through blades to spread the coating evenly on the film. The coatings are dried at 110° F. to finish the coated thermoplastic films. Thickness of the finished coatings on the films is about 0.25 mil (6.3 microns).

Composites are made with coated and uncoated interleafs for testing and controls. For each interleaf film to be tested, a composite is made with one sheet of the film interleaved in the center of a 24 ply unidirectional composite. For these evaluations the selected thermosetting resin material for the fiber reinforced prepreg layers is American Cyanamid Company CYCOM 3100, a bismaleimide composition in a prepreg reinforced with Hitex 46 graphite fibers in O° tape form.

The thickness of the prepreg is 4 mils. The test specimens are laid up and cured by the following cure and post cure cycles:

Cure:
  Heat 1 hour to 270° F. Hold
  Hold for 1 hour at 270° F.
  Apply 85 psi pressure
  Increase temperature to 350° F.
  Hold at 350° F. for 6 hours
  Cool under pressure
Post Cure:
  Heat 4 hours to 440° F.
  Hold for 12 hours at 440° F.

The cured composites are tested for strain release energy, expressed as in. lbs./in.$^2$, a measure of resistance to interlaminar fracture under interplanar shear. the test is described in Russell, A. J. and Street, K. N., "Factors Affecting the Interlaminar Fracture Energy of Graphite/Epoxy Laminates" PROCEEDINGS OF THE FOURTH INTERNATIONAL CONFERENCE ON COMPOSITE MATERIALS, ICCM-IV, OCTOBER 1982, TOKYO.

A control composite was made with no interleaf layer, for comparison with composites made with an interleaf layer of thermoplastic film having no thermosetting coating, and those were compared with composites made with interleafs of varying thickness which had been coated with Formulations A and B. For each kind of sample, two tests were made, one with a sample at room temperature and another with a sample heated to 400° F. Composites having an interleaf of two coated films laid up together were also made and tested. Composites made with two uncoated interleaf films laid up together had no strength; the two uncoated thermoplastic sheets did not bond to each other.

Composites made with interleaf films coated with Formulations I and II above when tested showed G II C values which in most instances were roughly comparable with those composites made with uncoated interleaf films of the same thermoplastic resin and of the same film thickness. In some samples the coated films made stronger composites than the uncoated film, and in others they did not. Composites made using an interleaf of two coated films laid up together had G II C values which in most cases were better than those of composites made with a single layer interleaf of the same film uncoated. This demonstrates the advantage of using coated films rather than uncoated films when two interleafs are laid in surface to surface contact in a composite. There is no bonding strength at the interface between two uncoated thermoplastic interleafs in a cured composite. With coated thermoplastic sheets the bonding strength is as good or better between two thermoplastic sheets as between thermoplastic and thermosetting sheets.

In Table I the composites tested are identified by numbers as follows:
1. One layer of Upilex R film No coating
2. One layer of Upilex R film Coated with Formulation I
3. One layer of Upilex R film coated with Formulation B
4. Two layers of Upilex R film Each coated with Formulation I
5. Two layers of Upilex film Each coated with Formulation II epoxy resin film. Size (thickness) of the film is designated in pounds per square foot (psf), which is the weight of the sheet. An FM 300 U, 0.06 psf, is an unsupported sheet of 0.06 pound per square foot. FM 300 K is a sheet of the same resin supported on knit polyester cloth. FM 300 is the same resin supported on polyester woven cloth. The modified epoxy composition in the FM 300 sheets is a mixture of a bisphenol A epoxy, a brominated bisphenol A epoxy, and tetra glycidyl methylene ditoluene.

To make a coated thermoplastic interleaf we apply a layer of an FM 300 series thermosetting adhesive on each side of a thermoplastic interleaf film of the kind described above, and press the layers together with slight heat (e.g. 120° C.) to join the sheets. This interleaf is then used as an adhesive interleaf to join the honeycomb core to skins of metal or fiber reinforced thermosetting resin sheets.

EXAMPLE 2

For making a honeycomb core composite, the coated interleaf layer is used to prevent moisture penetration into the honeycomb cavities through conventional reinforced thermoset epoxy skins. To test the strength of

TABLE I

| | | Interleaf Composites STRAIN RELEASE ENERGY G II C (in-lbs/in$^2$) | | | | |
|---|---|---|---|---|---|---|
| Interleaf | | 1 Uncoated | 2 1-layer Form. I | 3 1-layer Form. II | 4 2-layers Form. I | 5 2-layers Form. II |
| Film thickness mils | Solvent wiped yes/no | Room temp 400° F. | Room temp. 400° F. | Room temp. 400° F. | Room temp. 400° F. | Room temp. 400° F. |
| No film | — | 4.3 / 3.3 | — | — | — | — |
| 0.5 | no | 12 / 7.6 | 11 / 7.5 | 12 / 8.2 | 15 / 11 | — |
| 0.5 | yes | 12 / 8 | 12 / 8 | 13 / 8.6 | — | 15 / 8.2 |
| 1.0 | no | 1.7 / 5.9 | — | 2 / 3.7 | — | — |
| 1.0 | yes | 9.9 / 9.7 | 2.7 / 7 | 4.5 / 9.1 | — | — |
| 3.0 | no | 10 / 13 | 3.1 / 8.7 | 9.2 / 1.5 | 1.5 / 10.4 | — |
| 3.0 | yes | 17 / 14 | 12 / 12 | 24 / 15 | — | 19 / 18 |
| 5.0 | no | 11 / 18 | — | 17 / 19 | — | — |
| 5.0 | yes | 19 / 19 | — | 25 / 20 | — | 14 / 19 |

Interleaf sheets of thermoplastic film coated with thermosetting adhesives can be used as adhesive sheets for joining honeycomb composites. The continuous thermoplastic film presents a vapor barrier that will exclude water vapor from entry into the honeycomb cavities through outer walls of honeycomb composite. For this use we may construct the interleaf with conventional adhesives for joining honeycomb layers. American Cyanamid Company FM ® 300 adhesive resin sheets are examples. In the FM 300 series a thermosetting rubber modified epoxy resin adhesive is furnished in sheets of various thicknesses for use as thermosetting adhesives for joining members of a honeycomb composite. FM 300 U is an unsupported, modified the coated interleaf, however, we use a metal skin rather than epoxy skins to obtain a better test of the interleaf strength in tensile shear and sandwich peel tests.

Control samples are made using as honeycomb core a 7.9 pound per square feet aluminum foil honeycomb, designated 7.8 #, ¼", 0.004 NP, 5052. For the tensile shear test, samples are made with an aluminum skin designated 0.063", 2024, T3, Alclad. The skins are surface etched before use by a solution of sodium dichromate and $H_2SO_4$. For the sandwich peel test, samples are made using skins of aluminum designated 0.020", 2024, T3, Alclad. These skins are acid etched, the same as above, before use.

Honeycomb core composites are made for testing, using as adhesive sheets, the following:

| | |
|---|---|
| Sample No. 1. | FM ®300, 0.08 psf |
| Sample No. 2. | FM 300 K, 0.08 psf |
| Sample No. 3. | FM 300 U, 0.06 psf. |

Also, composites are made for testing using coated thermoplastic interleaf sheets as follows. All thermoplastic interleafs are of Upilex R, 0.5 mil thickness. Thermosetting sheets are applied to both sides of the interleaf as follows.

| | Honeycomb Side | Skin Side |
|---|---|---|
| Sample No. 4 | FM 300 U, 0.03 psf | FM 300 U, 0.03 psf |
| Sample No. 5 | FM 300 U, 0.06 psf | FM 300 U, 0.03 psf |
| Sample No. 6 | FM 300 U, 0.06 psf | FM 300 U, 0.06 psf |
| Sample No. 7 | FM 300, 0.08 psf | FM 300 U, 0.03 psf |
| Sample No. 8 | FM 300 K, 0.08 psf | FM 300 K, 0.08 psf |

To assemble the test samples, the adhesive sheets are placed between the honeycomb core and the skins, as indicated, and the assembly is heated for one hour at 350° F., and then pressed at 40 psi for another hour at 350° F. to finish the cure.

The samples are tested for sandwich peel strength by ASTM D1781 Climbing Drum Peel Test and are tested for tensile shear strength by ASTM D1002 Tensile Shear Test. Tests were made at minus 67° F., 76° F., and 250° F. Sandwich peel is reported as in. lbs./3 inch and Tensile Shear is reported as pounds per square inch, psi. Test results are tabulated in Table II.

TABLE II

| Sample No. | Sandwich Peel (in.lbs/3 in) | | Tensile Shear (psi) | | |
|---|---|---|---|---|---|
| | at 67° F. | at 75° F. | at 67° F. | at 75° F. | at 250° F. |
| 1 | — | 38 | 5080 | 5150 | 4000 |
| 2 | 40 | 45 | — | 5340 | 3375 |
| 3 | — | 39 | — | 5100 | — |
| 4 | 30 | 38 | 5000 | 5600 | 3625 |
| 5 | 24 | 36 | 4250 | 4700 | 4175 |
| 6 | 33 | 45 | 4750 | 4550 | 4500 |
| 7 | 108 | 85 | 4400 | 4750 | 3600 |
| 8 | 55 | 85 | 3750 | 5450 | 3950 |

Data in Table II demonstrate that the coated interleaf sheets can make composites with strength comparable to those made with the conventional adhesives. In honeycomb core composites having reinforced epoxy layers and thermoplastic interleaf, the continuous thermoplastic interleaf is a moisture barrier to exclude water vapor from the honeycomb core.

We claim:

1. An interleaf sheet comprising a thermoplastic polyimide resin film and coated on both surfaces of said film a thermosetting bismaleimide adhesive formulation.

2. A method of making a laminated composite comprising laying up composite layers comprising fiber reinforced thermosetting resin prepreg layers, with at least one thermoplastic interleaf layer between layers of said composite and in contact with at least one adjacent layer of thermosetting prepreg in said composite, said thermoplastic interleaf consisting of a thermoplastic polyimide resin film coated on both sides with a thermosetting bismaleimide adhesive resin formulation, and forming said layers into an interleaved composite by pressing and heating the composite to cure the thermosetting resin in said composites and to bond the layers into a laminated composite.

* * * * *